United States Patent
Saito et al.

[11] Patent Number: 5,855,824
[45] Date of Patent: Jan. 5, 1999

[54] EJECTING METHOD OF A MOLDING IN AN INJECTION MOLDING APPARATUS

[75] Inventors: Kiyohiro Saito; Tatsuo Nishimoto, both of Tokyo, Japan

[73] Assignee: Hoya Corporation, Tokyo, Japan

[21] Appl. No.: 759,100

[22] Filed: Dec. 3, 1996

[30] Foreign Application Priority Data

Dec. 4, 1995 [JP] Japan ................................. 7-315405

[51] Int. Cl.$^6$ .......................... B29C 45/17; B29C 45/26; B29C 45/40
[52] U.S. Cl. ..................... 264/2.2; 264/328.7; 264/334; 425/556; 425/808
[58] Field of Search .......................... 264/328.1, 328.7, 264/2.2, 2.3, 334, 335, 336; 425/556, 577, 808, 810

[56] References Cited

U.S. PATENT DOCUMENTS

| | | | |
|---|---|---|---|
| 4,184,835 | 1/1980 | Talbot | 425/577 |
| 4,364,878 | 12/1982 | Lalibert et al. | 264/2.2 |
| 4,828,769 | 5/1989 | Maus et al. | 264/1.3 |
| 4,900,242 | 2/1990 | Maus et al. | 425/149 |

FOREIGN PATENT DOCUMENTS

| | | |
|---|---|---|
| 0 339 642 | 11/1989 | European Pat. Off. |
| 0 380 688 | 8/1990 | European Pat. Off. |
| 0 244 783 | 2/1991 | European Pat. Off. |
| 54-148055 | 11/1979 | Japan |
| 61-66623 | 4/1986 | Japan |
| 2 050 928 | 1/1981 | United Kingdom |

OTHER PUBLICATIONS

SPIE—The International Society for Optical Engineering Reprinted from Ophthalmic Lens Design and Fabrication vol. 1529—Dated Jul. 25–26, 1991 (pp. 13–21) Improved Plastic Molding Technology for Ophthalmic Lens & Contact Lens by George Galic and Steve Maus.

Optical World; Injection–compression moulding of Rx polycarbonate lenses by George Galic (4 pages), 1991.

Engel Information; Sandwich Press Injection (10 pages) Apr., 1975.

*Primary Examiner*—Jill L. Heitbrink
*Attorney, Agent, or Firm*—Flynn, Thiel, Boutell & Thiel, P.C.

[57] ABSTRACT

An upper die 1 of a movable die corresponding with a lower die 2 of a stationary die is composed of a die body 3 and a die fitting member 4, in which a back insert 29, a hydraulic cylinder 23 and a pressure receiving portion 30 as a holding member of an insert 20 forming a cavity 22 is abutted to the die fitting member 4 by being urged upward by a spring 32. After resin, fed into the cavity 22, is compressed with the insert 20 by lifting the die fitting member 4 down, when the die fitting member 4 is lifted up at the degree of slightly opening S, by lifting the insert 20 down to be relatively to the die fitting member 4 with an eject pin 34, a space A between a molding 44 and the insert 20 is to be smaller, and the molding 44 is pushed out by causing the eject pin 34 to lift the insert 20 down when the upper die 1 and the lower die 2 are separated.

8 Claims, 8 Drawing Sheets

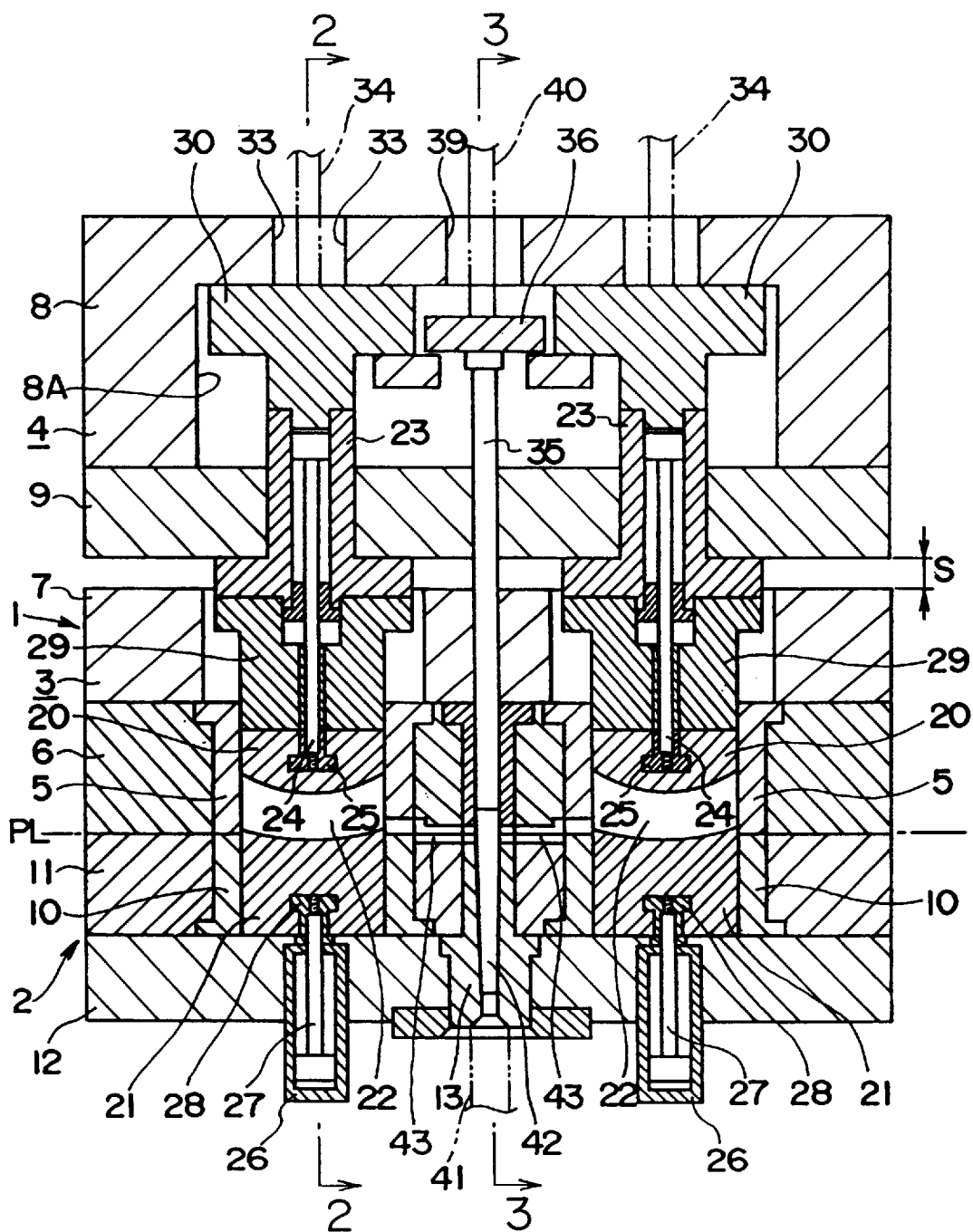
F I G. 1

EJECTING METHOD OF A MOLDING IN AN INJECTION MOLDING APPARATUS

BACKGROUND OF THE INVENTION

1. Field of the Invention

This invention relates to an ejecting method for ejecting a molding in an injection molding apparatus and a molding produced by using the ejecting method, which is suitable for a precision molding, for example, a spectacle lens.

2. Description of the Related Art

An injection molding apparatus for molding a spectacle lens is mentioned in Japanese Patent Application Publication No. Hei 5-30608.

A molding die used in the apparatus is composed of, as shown in FIG. 7, a stationary die 102 as a lower die and a movable die 101 as a upper die which are separated into lower and upper dies at a parting line PL. The movable die 101, moving to open from and close to the stationary die 102, includes, in turn, a die fitting member 104 and a die body 103 attached to the die fitting member 104 to move toward the stationary die 102. Further, in the die body 103, an insert 120 forming a cavity 122 by being movably put into an insert guide 105 is provided, in which a holding member 129, composed of a back insert holding the insert 120 and the like, is constantly supplied with elastic urging force of an elastic member (not shown) in an opposite direction to the stationary die 102, so that the holding member 129 is abutted to the die fitting member 104 of the movable die 101.

After molten resin is fed into the cavity 122 while the die body 103 of the movable die 101 closes to the stationary die 102, the die fitting member 104, locating a distance from the die body 103 (locating to make an opening from the die body 103 at the degree of slightly opening S), proceeds toward the stationary die 102 with a clamping cylinder (not shown), thereby the molten resin going to be cooling and caking in the cavity 122 is formed to be a specified configuration while being compressed by the insert 120. And further, the die fitting member 104 recedes from the stationary die 102 with the clamping cylinder (to make an opening at the degree of slightly opening S), and at the same time, the movable die 101 is opened from the stationary die 102. The holding member 129 is moved to be pushed toward the stationary die 102 when shifting an eject-pin 120 toward the die fitting member 104, so as to move the insert 120, thereby the molding in the cavity 122 of the movable die 101 is pushed out with the insert 120.

In the conventional art as described thus far, when the die fitting member 104 recedes with the clamping cylinder, the holding member 129 holding the insert 120 is constantly abutted in the opposite direction to the stationary die 102 to be in contact with the die fitting member 104 by being supplied with elastic urging force of the elastic member, so that the insert 120 recedes from the die body 103 together with the die fitting member 104. Resulting from the retreat, a space equal to the degree of the retreat (the degree of slightly opening S) is formed between the molding in the cavity 122 and the insert 120. Therefore, as shown in FIG. 8, when the molding is pushed out from the cavity 122 with the insert 120 by moving the holding 129 to push toward the stationary die 102 by the eject-pin 134, air between the molding and the insert 120 is, firstly, compressed, and then by the compressed air, the molding is pushed out from the cavity 122.

That is to say, the molding is not directly pushed out with the insert 120, and is pushed out by the compressed air like an air gun. Regarding this point, the compressed air damages the molding, resulting in possibility that a molding precision of the molding is reduced.

Especially, in the case the above molding is a spectacle lens, the surface of the lens is harmfully influenced by compressed force caused by the compressed air, resulting in possibility that the high-precise lens cannot be ensured.

It is an object of the present invention to provide the ejecting method of the molding in the injection molding apparatus and the molding produced by using the ejecting method, in which the molding can be pushed out with control of producing the compressed air and the high-precise lens can be ensured.

SUMMARY OF THE INVENTION

In order to attain this object, an ejecting method of a molding in an injection molding apparatus according to the present invention, in which a movable die opening from and closing to a corresponding stationary die is structured with a die fitting member and a die body, attached to the die fitting member to move toward the stationary die, an insert is provided in the die body to be inserted into an insert guide to form a cavity, and a holding member holding the insert is constantly abutted in the opposite direction to the stationary die to be in contact with the die fitting member by being supplied with elastic urging force of an elastic member, so that a molten resin fed into the cavity is compressed with the insert by advancing the die fitting member toward the stationary die, the die fitting member is retreated to separate the movable die from the stationary die, and the molding is pushed out with the insert by moving the holding member to be pushed toward the stationary die when shifting an eject pin toward the die fitting member, is characterized by the steps of: advancing the insert toward the stationary die relatively to the die fitting member by moving the holding member to be pushed toward the stationary die by the eject pin when the die fitting member is retreated; separating the movable die from the stationary die; and pushing the molding out with the insert in accordance of a movement of the holding member pushed by the eject pin.

In the aforementioned description, the ejecting method can be applied for an injection molding apparatus of a vertical type, in which the movable die is closed to and opened from the stationary die in the vertical direction, and an injection molding apparatus of a horizontal type, in which the movable die is closed and opened in the horizontal direction.

The ejecting method can be applied for the case that the insert is provided to only the movable die, and also for the case that the inserts are provided to both of the movable die and the stationary die.

In the ejecting method according to the present invention, the holding member is moved to be pushed toward the stationary die with the eject pin when the die fitting member of the movable die is retreated, thereby the insert is advanced toward the stationary die relatively to the die fitting member of the movable die, so that the same space as the degree that die fitting member is retreated cannot be formed between the molding in the cavity and the insert, therefore, the compressed air can be controlled to be produced excessively, and naturally, the molding is prevented from the influence of the pressure caused by the compressed air, so that bend of a sprue, a runner or the like and quality deficiencies caused when the molding is removed from the mold, such as deviation to the mold after the molding is removed from the mold, are not produced, resulting in the molding having the high-accuracy of molding.

Here, when the insert is advanced toward the stationary die relatively to the die fitting member of the movable die by moving the holding member to push by the eject pin when the die fitting member of the movable die is retreated, the degree that the insert is advanced may be the same as the degree that the die fitting member is retreated (the degree of slightly opening), and may be lager than the degree that the die fitting member is retreated, more preferably, smaller than the degree that the die fitting member is retreated.

When the degree that the insert is advanced is defined to be smaller than the degree that the die fitting member is retreated, the space can be formed between the insert and the molding, therefore, the molding does not fall out from the cavity even when the movable die is opened from the stationary die, with the result that the molding is prevented from damage caused by falling. Especially, it is advisable that the space between the insert and the molding is defined as 1–4 mm.

The number of cavities provided in the die body of the movable die may be one, but also may be more than one. When the more than one cavity is provided, and the holding member holding the insert for each cavity is supplied with the elastic urging force of the elastic member in the opposite direction to the stationary die to be independent of one another, the holding member is moved to be pushed by the eject pin provided in each holding member.

According to the above description, each holding member can be individually moved to be pushed by the eject pin, therefore, the molding can be reliably pushed out from each cavity with the insert.

The molding produced by the ejecting method of the molding in the injection molding apparatus according to the present invention, in which a movable die opening from and closing to a corresponding stationary die is structured with a die fitting member and a die body, attached to the die fitting member to move toward the stationary die, an insert is provided in the die body to be inserted into an insert guide to form a cavity, and a holding member holding the insert is constantly abutted in the opposite direction to the stationary die to be in contact with the die fitting member by being supplied with elastic urging force of an elastic member, so that a molten resin fed into the cavity is compressed with the insert by advancing the die fitting member toward the stationary die, the die fitting member is retreated to separate the movable die from the stationary die, and the molding is pushed out with the insert by moving the holding member to be pushed toward the stationary die when shifting an eject pin toward the die fitting member, is characterized by the following method of: advancing the insert toward the stationary die relatively to the die filling member by moving the holding member to push toward the stationary die by using the eject pin when the die fitting member is retreated; separating the movable die from the stationary die; and pushing the molding out with the insert in accordance of a movement of the holding member pushed by the eject pin.

In the aforementioned description, kinds of molding, molded with the molten resin fed into the cavity, is selective, more appropriately, a precise molding, such as a part of a device, a part of an electric mechanism with high precision. More preferably, an optical lens formed with a thermoplastic resin, especially, a spectacle lens having a meniscus-shape, more specifically, a minus lens having the thinner central portion than the peripheral portion or a plus lens having the thicker central portion than the peripheral portion.

BRIEF DESCRIPTION OF THE DRAWINGS

FIG. 1 is a vertically sectional view of a molding die of an injection molding apparatus used in a preferred embodiment of the present invention;

DETAILED DESCRIPTION OF THE PREFERRED EMBODIMENT(S)

Figure 2:
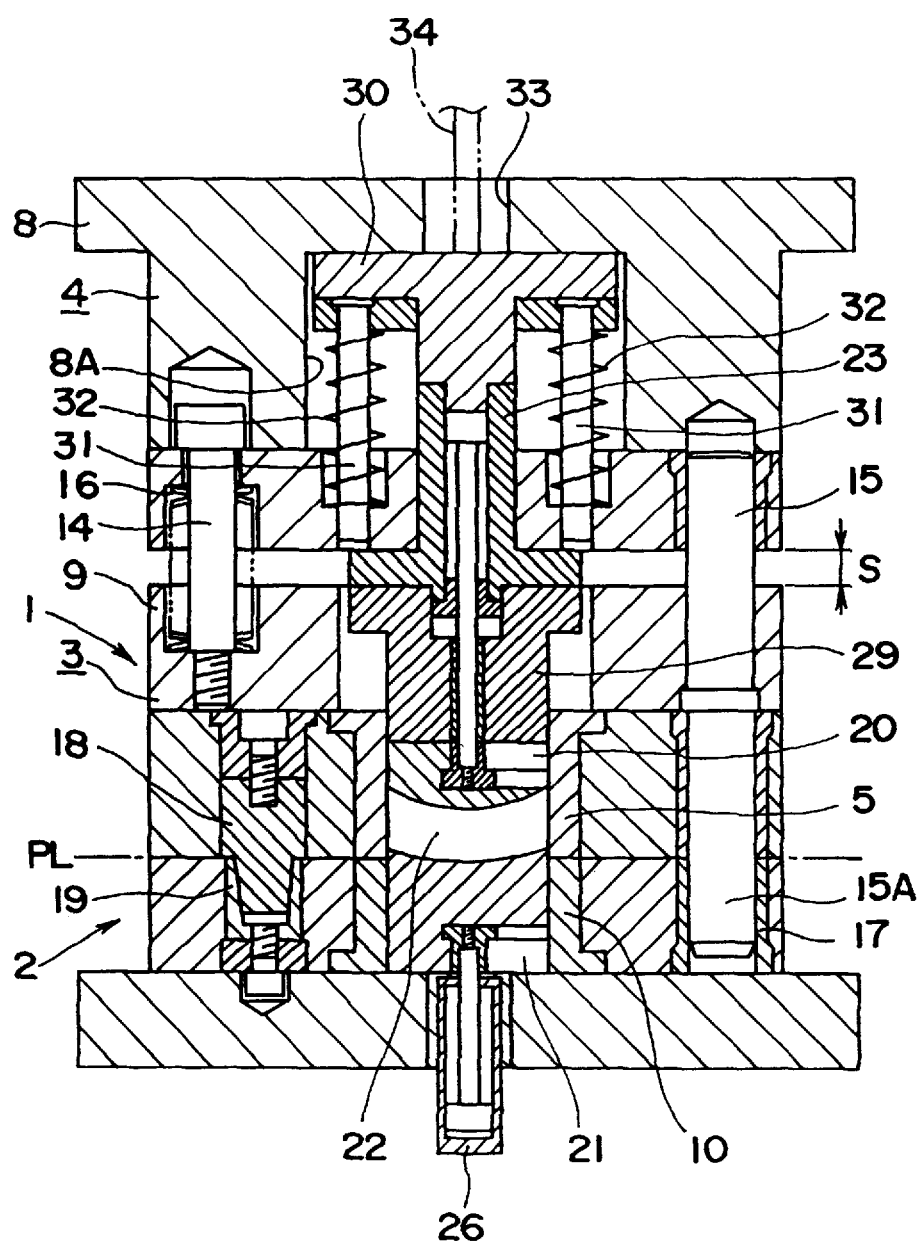
FIG. 2 is a sectional view taken along the II—II line in FIG. 1.

The preferred embodiment of the present invention will be explained below with reference to the attached drawings. FIG. 1 shows a sectional view of a molding die of an injection molding apparatus used for carrying out an ejecting method of a molding according to the embodiment, FIG. 2 and FIG. 3 are sectional views taken along the II—II line and the III—III line in FIG. 1.

The molding of the embodiment is a spectacle lens as a sort of optical lens (a spectacle lens of a meniscus-shape), in which the material is a thermoplastic resin such as PMMA (poly methyl methacrylate), PC (polycarbonate) or the like. The molding die can be formed with a selective material such as glass, ceramic or the like besides metallic material.

As shown in FIG. 1, the molding die is composed of an upper die 1 and a lower die 2, in which the upper die 1 is a movable die closing to and opening from the lower die 2 as a stationary die in the vertical direction, and a parting line PL is horizontal. The upper die 1, in turn, is composed of a die body 3 located in the lower side and a die fitting member 4 located in the upper side, in which the die body 3 includes an insert guide 5, die plates 6 and 7 and so on and the die fitting member 4 includes an upper member 8, a lower member 9 and so on. The lower die 2 is composed of an insert guide 10, die plates 11 and 12, sprue bush 13 and so on.

Figure 3:
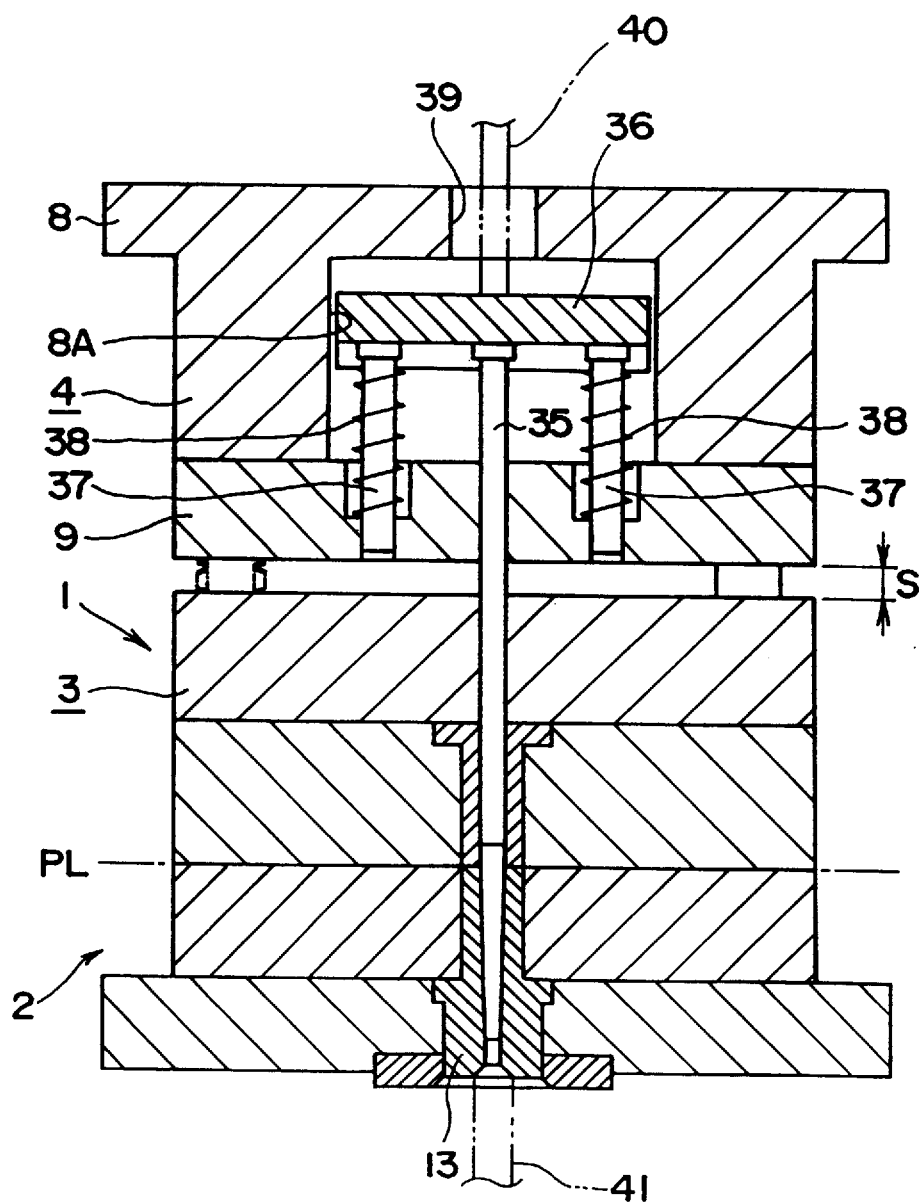
FIG. 3 is a sectional view taken along the III—III line in FIG. 1.

As shown in FIG. 2, the die body 3 of the upper die 1 is attached to the die fitting member 4 with a bolt 14 to be able to move at the degree of slightly opening S while being guided toward the lower die 2 with a guide rod 15, so that a space of the degree of slightly opening S is formed between the die body 3 and the die fitting member 4, in which urging force, working downward, of a plate spring 16 arranged on the outer circumference of the bolt 14, acts the die body 3.

The die fitting member 4 is attached to a clamping cylinder (not shown), in which the die fitting member 4 and the die body 3 are vertically moved by the clamping cylinder, more specifically, the upper die 1, composed of the die body 3 and the die fitting member 4, is vertically moved to close to or open from the lower die 2 by the clamping cylinder while an end 15A of the guide rod 15 located in the upper die 1 is inserted into or removed from a guide cylinder 17 located in the lower die 2, and a positioning pin 18 located in the upper die 1 is inserted into a positioning cylinder 19 located in the lower die 2, thereby the upper die 1 and the lower die 2 are definitely positioned when the mold is closed.

A cylinder for slightly opening (not shown) is located downward the lower die 2, in which the cylinder for slightly opening causes the die fitting member 4 to be raised against clamping force caused by the clamping cylinder so as to make a space from the die body 3 at the degree of slightly opening S.

An upper insert 20 is inserted into the insert guide 5, provided in the die body 3 of the upper die 1, to be moved in the vertical direction, and further a lower insert 21 is inserted into the insert guide 10 provided in the lower die 2 to be moved in the vertical direction. By both of the upper insert 20 and the lower insert 21, a cavity 22 is formed, and as shown in FIG. 1, the two cavities 22 are formed, therefore, the molding die according to the embodiment is for two moldings in order to simultaneously form two spectacle lenses.

Each upper insert 20 is attached through a T-shaped clamping member 25 to a piston rod 24 of a hydraulic cylinder 23, oriented in a downward direction in the die fitting member 4 of the upper die 1 to be able to move in the vertical direction, and further each lower insert 21 is attached through a T-shaped clamping member 28 to a piston rod 27 of a hydraulic cylinder 26, fixed in a upward direction in the lower die 2. On the lower side of the hydraulic cylinder 23, a back insert 29, inserted with a piston rod 24 to move therein in the vertical direction, is fixed. When the upper die 1 and the lower die 2 are separated from one another at the parting line PL to raise the upper die 1 by using the clamping cylinder, the upper insert 20 and the lower insert 21 are exposed between the upper die 1 and the lower die 2 by extending the piston rods 24 and 27, and further T-shaped grooves of the inserts 20 and 21, engaging with the T-shaped clamping members 25 and 28, have openings to extend until the circumferential faces of the inserts 20 and 21, so that the inserts 20 and 21 can be detached from the T-shaped clamping members 25 and 28 by using the engagement of the T-shaped grooves with the T-shaped clamping members 25 and 28, with the result that various inserts corresponding to the formed spectacle lens can be exchangeably attached to the upper die 1 and the lower die 2. On the other hand, when the piston rods 24 and 27 are contracted, the upper insert 20 and the lower insert 21 are to be a flatly touching state by respectively abutting the back insert 29 and the die plate 12 of the lower die 2, thereby the inserts 20 and 21 are clamped.

When the upper insert 20 is abutted to the back insert 29 and clamped, the upper insert 20 is held with the back insert 29 and the hydraulic cylinder 23, that is to say, the back insert 29, the hydraulic cylinder 23, and a pressure receiving portion 30, attached onto the upper face of the hydraulic cylinder 23 and located into a recessed portion 8A of the upper member 8 composing the die fitting member 4 of the upper die 1, are a holding member for holding the upper insert 20. As shown in FIG. 2, a pair of guide bars 31, slidably inserted into the lower member 9 of the die fitting member 4, droops from the pressure receiving portion 30, in which the pressure receiving portion 30, the hydraulic cylinder 23 and the back insert 29 are constantly supplied with the elastic urging force of springs 32 in the upward direction of the opposite direction to the lower die 2, wound on the circumferences of the guide bars 31, therefore the pressure receiving portion 30 is abutted onto the upper face of the recessed portion 8A, formed in the downward direction in the upper member 8 of the die fitting member 4. A pair of the guide bars 31 and the springs 32 are provided to each pressure receiving portion 30, and the back insert 29, the hydraulic cylinder 23 and the pressure receiving portion 30, which are the holding members of the upper insert 20, are supplied with the elastic urging force of the spring 32 as the elastic member in the upward direction to be independent of one another in each upper insert 20.

A through hole 33 is formed on the upper member 8 of the die fitting member 4 to reach the recessed portion 8A, in which an eject pin 34 is inserted into the through hole 33 to move in the vertical direction by an eject cylinder (not shown). The lower end of the eject pin 34 is abutted to the pressure receiving portion 30, so that the pressure receiving portion 30, the hydraulic cylinder 23, the back insert 29, and the upper insert 20 are moved to be pushed downward from the upper die 1 by lifting the eject pin 34 down by using the eject cylinder. As shown in FIG. 1, the eject pin 34 as described above is provided to each pressure receiving portion 30.

An eject bar 35 is passed through the central portion of the die body 3 of the upper die 1 and the lower member 9 of the die fitting member 4 to move in the vertical direction, and further, as shown in FIG. 3, a pair of guide bars 37, slidably inserted in the lower member 9 in the vertical direction, is droopily fixed to the pressure receiving portion 36 mounted on the upper end of the eject bar 35, so that the pressure receiving portion 36 and the eject bar 35 are constantly supplied, in the upward direction, with the elastic urging force of the springs 38 wound on the outer circumference of the guide bar 37 all the time. An amount of elastic urging force is the amount that a space is formed between the pressure receiving portion 36 and the upper face of the recessed portion 8A located with the pressure receiving portion 36, in which an eject pin 40, vertically moved by an eject cylinder (not shown), is inserted into a through hole 39 formed in the upper member 8 to cause the pressure receiving portion 36 and the eject bar 37 to move to push downward.

An operation of the injection molding will be explained below. First, the upper die 1, opening from the lower die 2, is moved down by the clamping cylinder, and further the die fitting member 4 is moved down by the clamping cylinder even after the die body 3 of the upper die 1 is abutted to the lower die 2, resulting in disappearance of the degree of slightly opening S. After that, the die fitting member 4 is lifted up by using the cylinder for slightly opening to form a space at the degree of slightly opening S, and continuously, the molten resin is injected from an injecting nozzle 41, connected to the sprue bush 13, to be fed through a sprue 42 and a runner 43 into each cavity 22.

Figure 4:
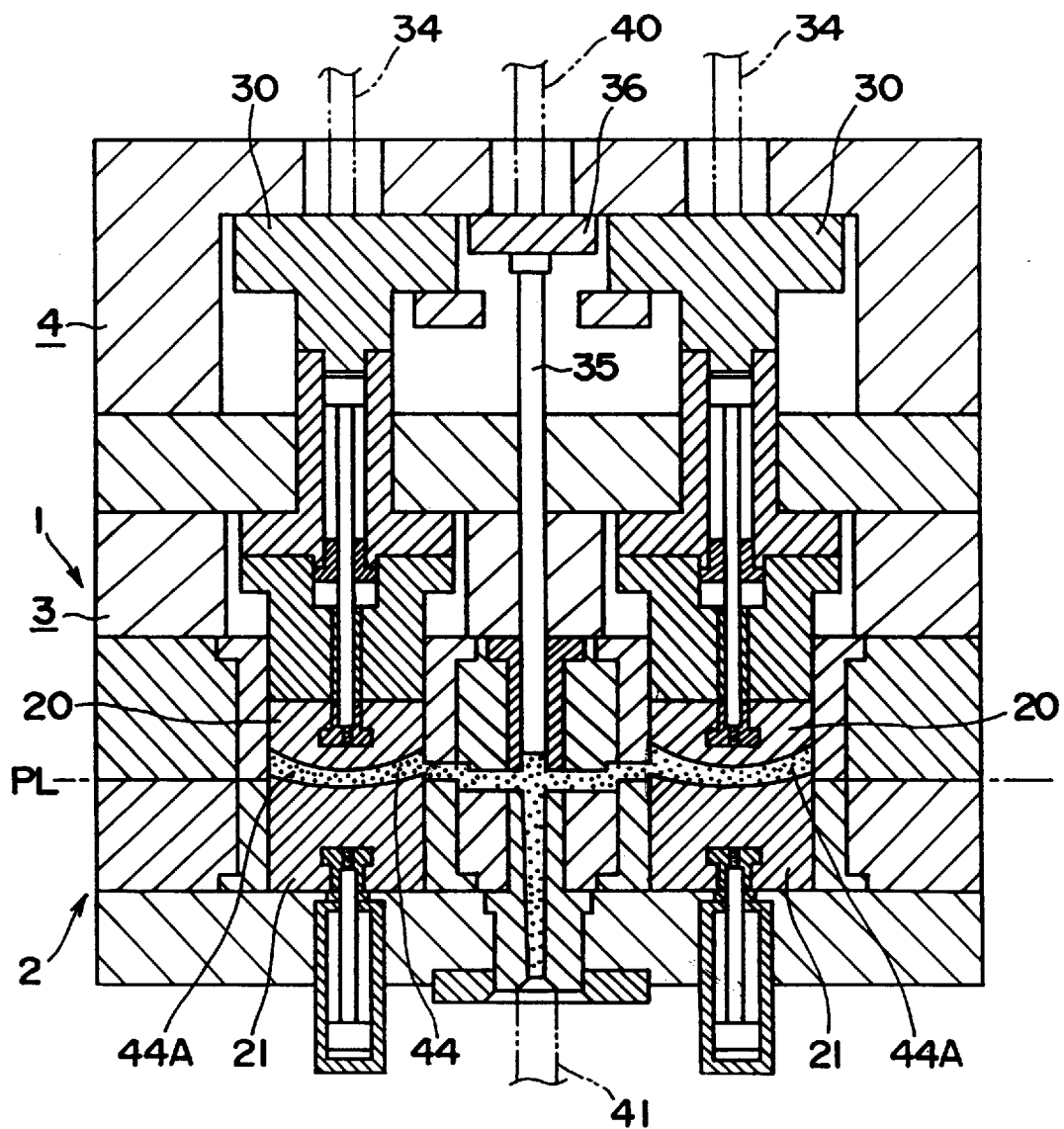
FIG. 4 is a vertically sectional view of the molding die showing a state molten resin in a cavity is compressed with an upper insert.

After feeding or while feeding the molten resin, the die fitting member 4 is moved down by the clamping cylinder, namely, is advanced toward the lower die 2. Thereof, the pressure receiving portion 4, abutting onto the upper face of the recessed portion 8A formed in the upper member 8 of the die fitting member 4, is moved down to compress the molten resin, becoming shrank in the cavity 22 according as it is gradually cooled and caked, with the upper insert 20. FIG. 4 shows the final state in the compressing process, in which the degree of slightly opening S is disappeared.

After that, the die fitting member 4 of the upper die 1 is lifted up by the clamping cylinder, namely, is retreated from the lower die 2 so as to open the space at the degree of slightly opening S between the die body 3 and the die fitting member 4. At this time, the eject pin 34 is moved down by using the eject cylinder to cause the pressure receiving portion 30 to move downward from the die fitting member 4 to press. The degree of the pushed movement is smaller than the degree of slightly opening S, for example, when the degree of slightly opening S is 15 mm, the degree of the pressured movement is 13 mm. In other words, when the die fitting member 4 is retreated, the upper insert 20 is advanced toward the lower die 2 relatively to the die fitting member 4.

Figure 5:
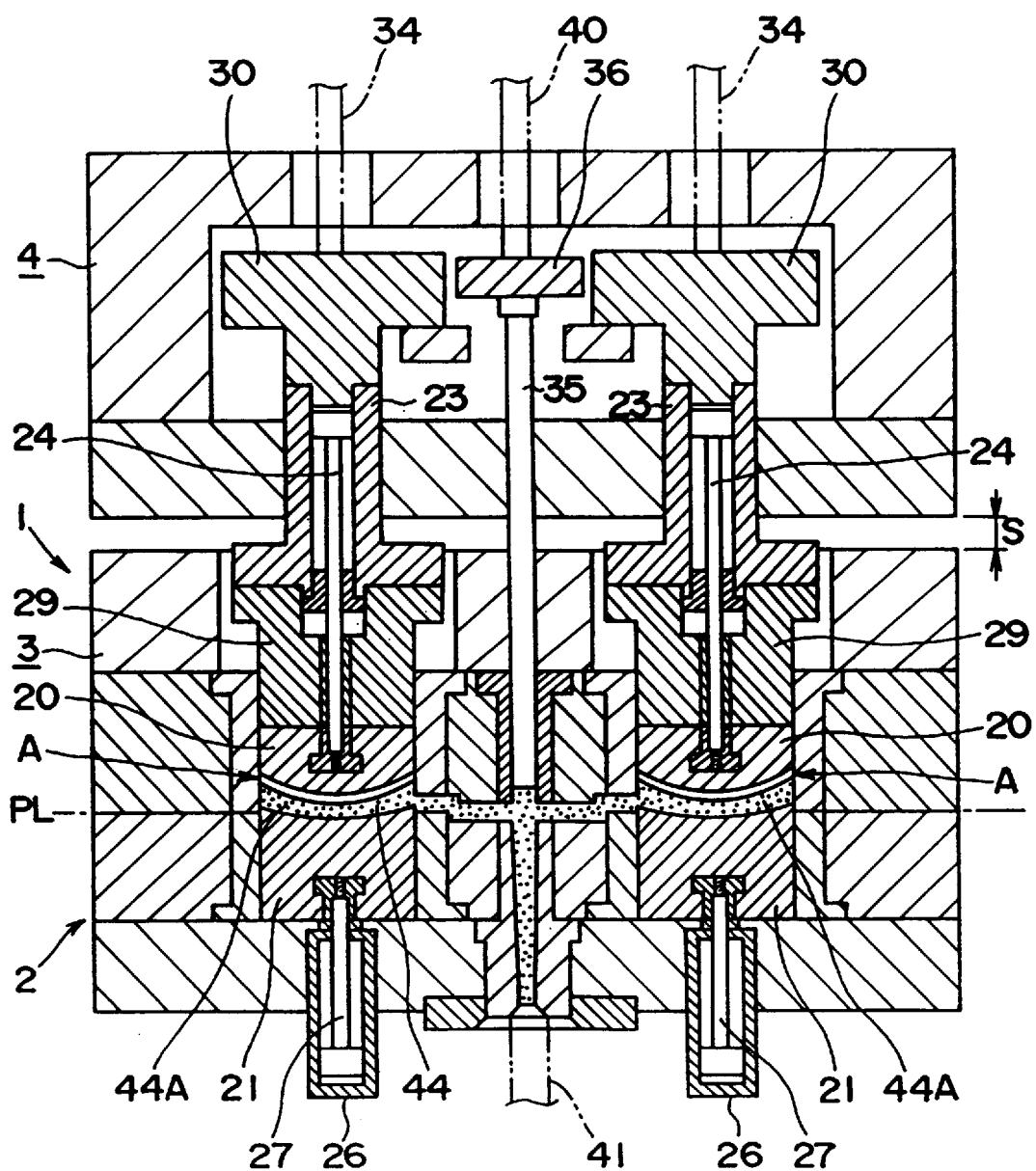
FIG. 5 is a vertically sectional view of the molding die showing a state in which, with continuing from the state of FIG. 4, a die fitting member of the upper die is lifted from a die body for the degree of slightly opening and the upper insert is moved downward relatively to the die fitting member with an eject-pin.

As a result, the degree of the upward-movement of the upper insert 20, which should be, originally, lifted up at the same degree as when the die fitting member 4 is lifted up at the degree of slightly opening S, is controlled to be smaller, that is to say, as shown in FIG. 5, the upper insert 20 is a slightly space A, which is 2 mm when the degree of slightly opening S and the degree of the pressured movement are values as described above, distant from the spectacle lens 44A as the molding 44 molded in the cavity 22. It will be further observed from this figure that eject pin 40 is actuated so that as die fitting member 4 is retracted, the end of eject bar 35 maintains contact with the molding formed in sprue 42.

Figure 6:
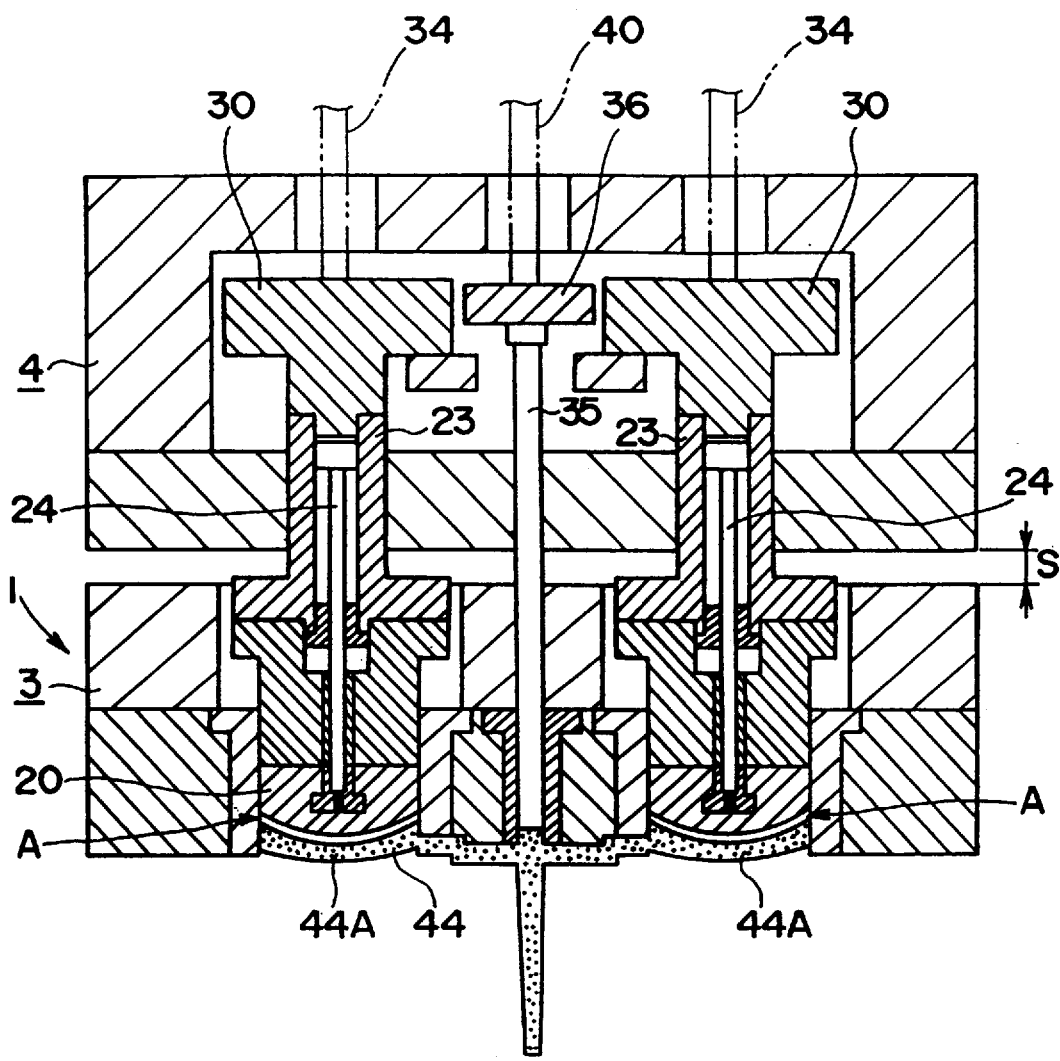
FIG. 6 is a vertically sectional view of the molding die showing a state in which the upper die and a lower die are opened, with continuing from the state of FIG. 5.
Figure 6:
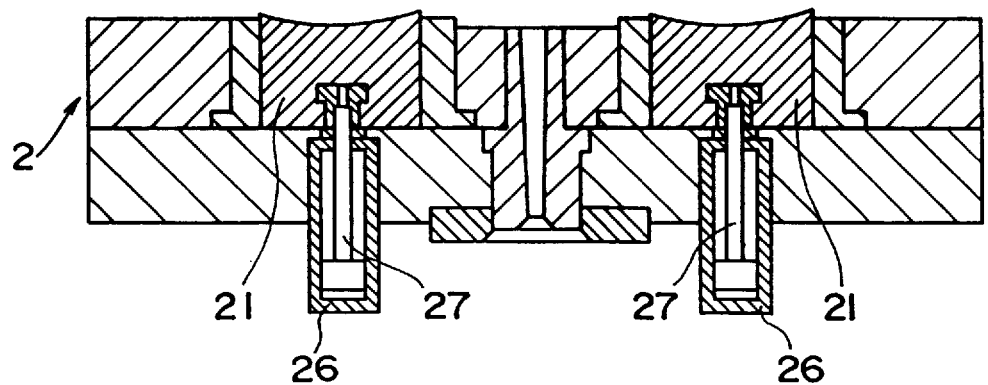
Figure 7:
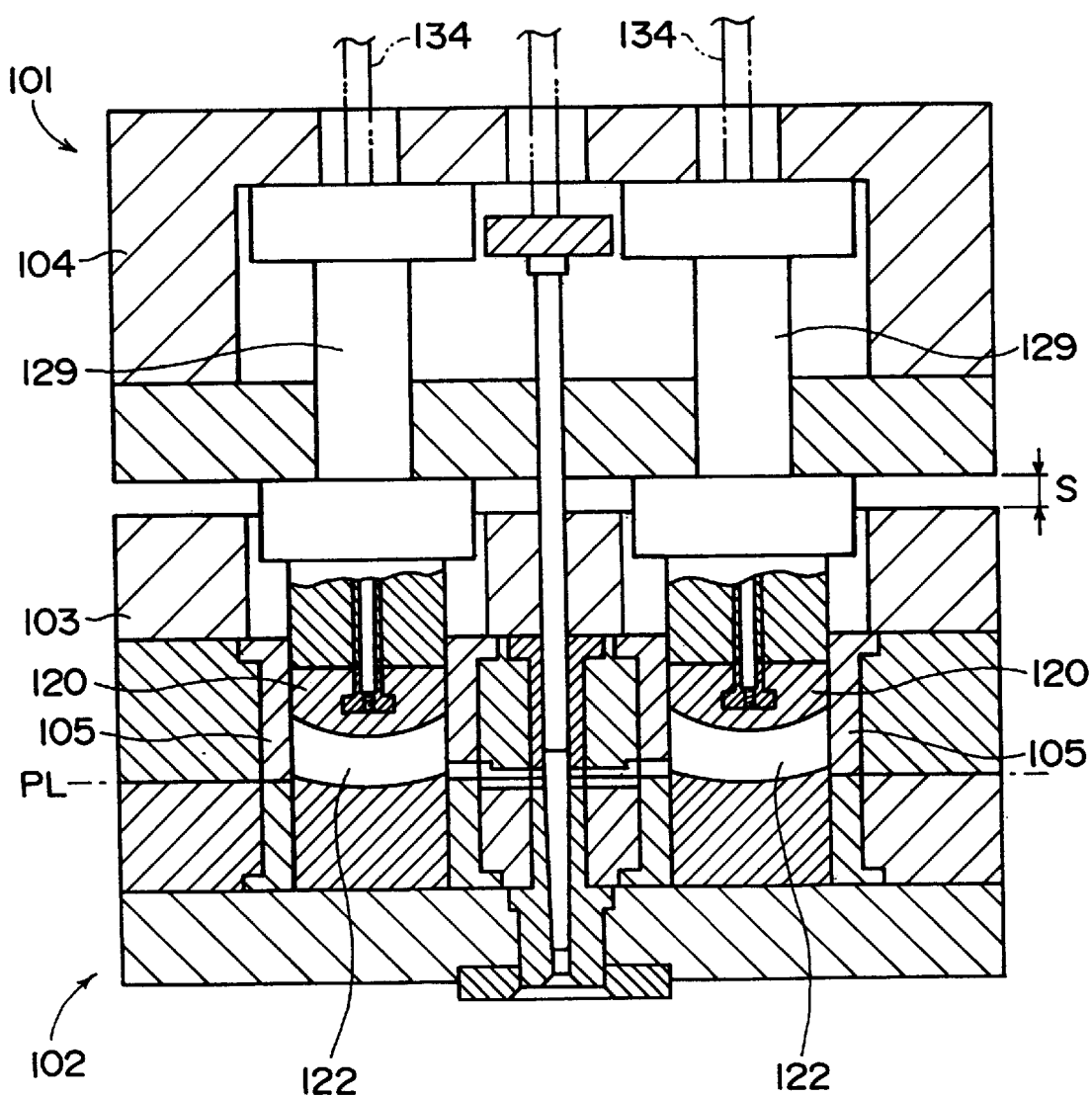
FIG. 7 is a vertically sectional view of the molding die on a conventional injection molding apparatus.
Figure 8:
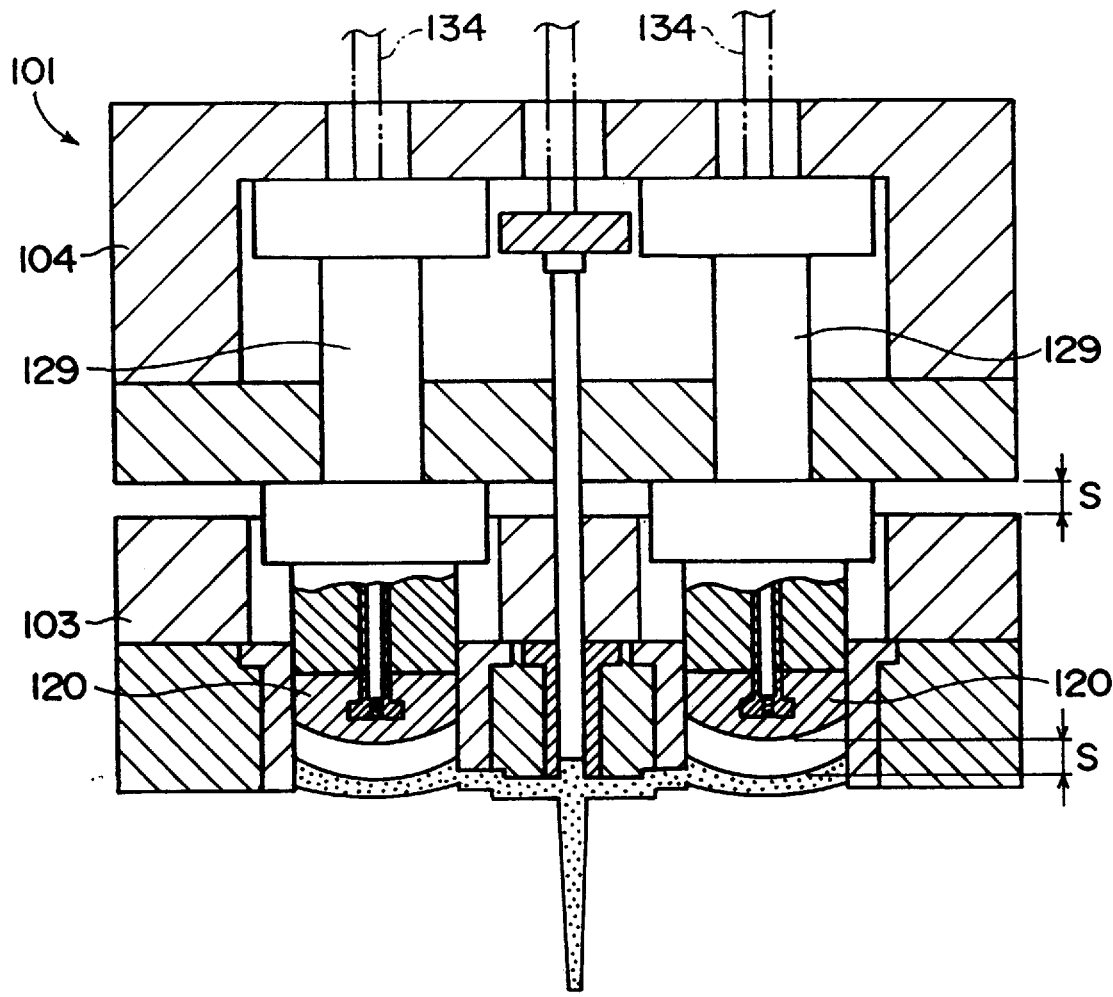
FIG. 8 is a diagram showing a state the molding is ejected in the molding die of FIG. 7.
Figure 8:
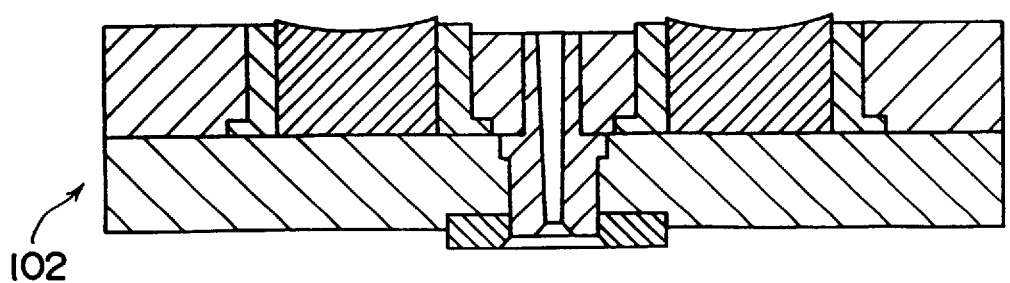

As shown in FIG. 6, the die fitting member 4 and the die body 3 of the upper die 1 are lifted up by the clamping cylinder so as to open the upper die 1 from the lower die 2 at the parting line PL. After that, a part of the molding 44 exposed from the lower face of the upper die 1 is gripped by a gripping device, and further, the eject pins 34 and 40 are moved down by each eject cylinder, thereby the pressure receiving portions 30 and 36 are moved to be pressed, naturally, the moldings 44 are pushed out with the upper insert 20 and the eject bar 35. Since the end of eject bar 35 is in contact with the molding 44, the eject bar initially pushes the adjacent section of the molding out of the die body. At this time the molding 44 is pushed out, the upper insert 20 is only the space A distant from the spectacle lens 44A of the molding 44, so that air entering the space A is not compressed until becoming large pressure by the upper insert 20, with the result that the molding 44 can be pushed out from the upper die 1 without the influence of the large pressure of the compressed air upon the spectacle lens 44A.

More specifically, when the die fitting member 4 of the upper die 1 is lifted up at the degree of slightly opening S from the die body 3, the pressure receiving portion 30 is not moved downward to be pushed by the eject pin 34, and further when the upper insert 20 is not lifted down relatively to the die fitting member 4, the space, having the same degree as the degree of slightly opening S, is formed between the spectacle lens 44A of the molding 44 and the upper insert 20, so that the high-pressure air influences the spectacle lens 44A as a precise molding portion by greatly compressing air in the space when the spectacle lens 44A is pushed out with the upper insert 20, however, in the embodiment according to the present invention, a slight space A is formed between the spectacle lens 44A and the upper insert 20, so that the molding 44 can be pushed out with controlling to produce the compressed air when the spectacle lens 44A of the molding 44 is pushed out with the upper insert 20, with the result that the precise molding state of the spectacle lens 44A is ensured.

In the embodiment, when the upper insert 20 is moved down relatively to the die fitting member 4 by moving the pressure receiving portion 30 downward to push by the eject pin 34 at the time the die fitting member 4 of the upper die 1 is lifted up at only the degree of slightly opening S from the die body 3, the degree of the downward-movement is defined to be smaller than the degree of the upward-movement (the degree of slightly opening S), so that the space can be formed between the upper insert 40 and the spectacle lens 44A of the molding 44. Therefore, the molding 44 does not fall out from the cavity 22 even when the upper die 1 is opened from the lower die 2, resulting in the prevention that the molding 44 is damaged by falling.

Furthermore, in the embodiment, the two cavities 22 is formed by the upper insert 20 and the like, and the holding member of the upper insert 20, composed of the back insert 29, the hydraulic cylinder 23 and the pressure receiving portion 30, is supplied with the elastic urging force of the spring 32 in the upward direction to be independent of one another in each upper insert 20, therefore even when the spring 32 of each upper insert 20 has a different force caused by the spring, the structure is not under the influence of the force caused by the spring, however, the eject pin 34 is provided to each upper insert 20, namely, each holding member of the upper insert 20, so that the holding member independent of one another can be moved to be pushed downward by the eject pin 34 with the specified processes, with the result that two spectacle lenses 44A of the moldings 44 can be pushed out with the two upper inserts 20.

In the embodiment as described thus far, the eject pin 34 is intended to be moved downward with two steps to correspond with at the time the die fitting member 4 of the upper die 1 is lifted up from the die body 3 at the degree of slightly opening S, and at the time the die body 3 is distance away from the lower die 2 to open the mold, but when the movement of slightly opening the die fitting member 4 by the clamping cylinder and the movement of opening the mold to separate the die body 3 from the lower die 2 are continuously carried out, the eject pin 34 is continuously moved downward, thereby the degree of the downward-movement of the upper insert 20 from the die fitting member 4 is defined to be larger, and with retaining the larger degree of the downward-movement, the molding 44 may be pushed out.

Incidentally, the aforementioned embodiment has been mentioned as for a minus lens having the thinner central portion than the peripheral portion, but can be applied to a plus lens having the thicker central portion than the peripheral portion.

According to the present invention, when the die fitting member of the movable die is retreated from the stationary die, the holding member, holding the insert provided in the die body of the movable die, is moved to be pushed toward the stationary die with the eject pin, and the insert is advanced toward the stationary die relatively to the die fitting member, so that the molding can be pushed out while the compressed air is controlled to be produced when the molding is pushed out with the insert, and by extension the pressure of the air compressed at high-pressure does not have influence on the molding, with the result that the pushing-out operation can be carried out while the molding accuracy of the molding molded high-accurately.

What is claimed is:

1. A method of ejecting a molding from an injection molding apparatus, the injection molding apparatus having a movable die that opens from and closes to a corresponding stationary die, the movable die having: a die fitting member; a die body movably attached to the die fitting member that moves toward the stationary die; a movable insert located in an insert guide, mounted to the die body so as to be located adjacent the stationary member, the insert guide forming a cavity in which the insert is located that opens toward the stationary die; a holding member for holding the insert in the insert guide, wherein the holding member is biased by an elastic member to constantly urge the insert in a direction opposite to the direction of the stationary die and; an eject pin that extends against the holding member for pushing the holding member and the insert towards the stationary die so that a molten resin fed into the cavity is compressed with the insert by the advancement of the die fitting member toward the stationary die, the die fitting member is retracted to separate the movable die from the stationary die, and the molding is pushed out by the insert by moving the holding member with the eject pin toward the die fitting member, said method of ejecting the molding from the injection molding apparatus comprising the steps of:

retracting the die fitting member from the stationary die after the compression of the molding while maintaining the die body and the insert guide closed against the stationary die and, simultaneously with said retraction of the die fitting member, preliminarily ejecting the molding by advancing the insert a predetermined distance toward the stationary die relative to said die fitting member by moving the holding member toward the stationary die with the eject pin;

after said retraction of said die fitting member and said advancement of said insert, separating the movable die from the stationary die; and fully ejecting the molding by pushing the molding out of the cavity with the insert by moving the holding member with the eject pin.

2. The ejecting method according to claim 1, further comprising the step of forming a space between the insert and the molding by advancing the insert a smaller distance than the distance that the die fitting member is retracted when the insert is advanced toward the stationary die relative to the die fitting member.

3. The ejecting method according to claim 2, wherein said space between the insert and the molding is between 1–4 mm.

4. The ejecting method according to claim 1, wherein the injection molding apparatus has plural cavities, a holding member and an insert are provided for each cavity, and the holding members are supplied with elastic members for urging the holding members and the inserts in the opposite direction to the stationary die independently of one another, and each holding member is moved by an eject pin provided for each holding member.

5. The ejecting method according to claim 1, wherein said molding that is molded when the molten resin fed into the cavity is an optical lens and the molten resin is a thermoplastic resin.

6. The ejecting method according to claim 5, wherein said optical lens is a spectacle lens having a meniscus-shape.

7. The ejecting method according to claim 6, wherein said spectacle lens is a minus lens having the thinner central portion than the peripheral portion.

8. The ejecting method according to claim 6, wherein said spectacle lens is a plus lens having the thicker central portion than the peripheral portion.

* * * * *